July 24, 1934.  J. J. GAUGHRAN, JR., ET AL  1,967,504
WINDOW VENTILATOR
Filed March 2, 1933
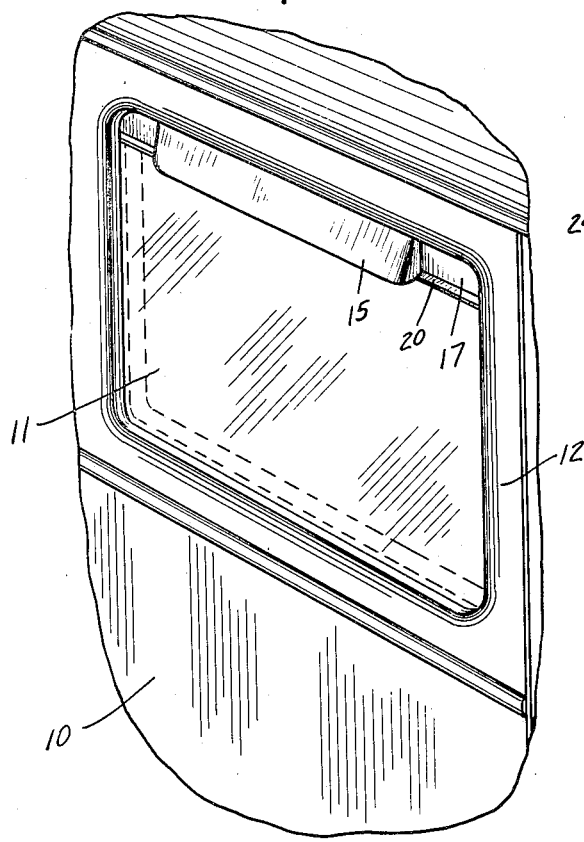
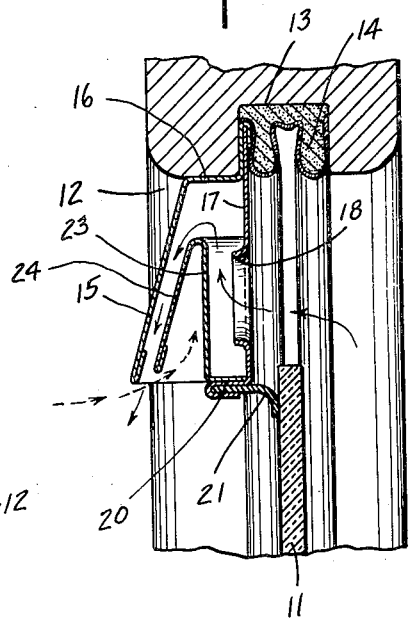
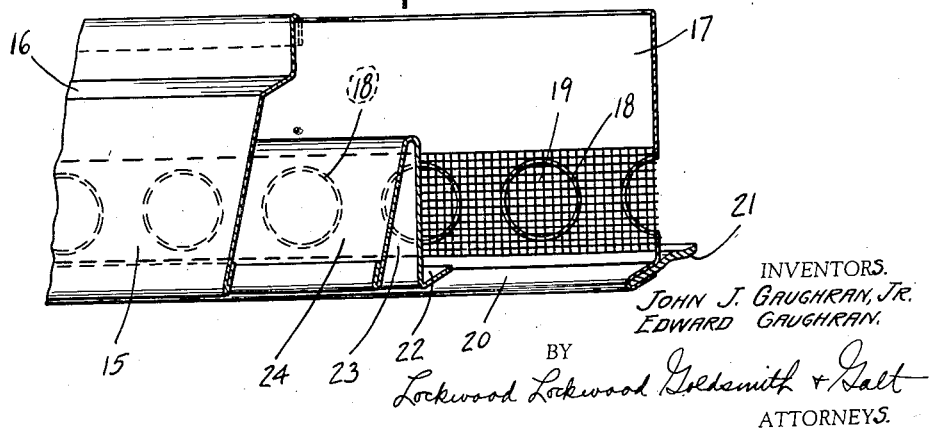
INVENTORS.
JOHN J. GAUGHRAN, JR.
EDWARD GAUGHRAN.
BY
Lockwood Lockwood Goldsmith & Galt
ATTORNEYS.

Patented July 24, 1934

1,967,504

UNITED STATES PATENT OFFICE 1,967,504

WINDOW VENTILATOR

John J. Gaughran, Jr., and Edward Gaughran, Muncie, Ind.

Application March 2, 1933, Serial No. 659,328

4 Claims. (Cl. 98—2)

This invention relates to a ventilator for compartments, such as rooms, railway cars, buses and automobiles.

The principal object of the invention is to provide a ventilator of this character of simple structure, economical in cost of production and which may be readily installed in connection with windows or similar openings.

The principal feature of the invention resides in the arrangement of a trough-like baffle plate mounted within a hood-like ventilator which will effectively prevent air from entering the compartment from the outside while at the same time freely emitting foul air from the inside. While it permits free egress of foul air, usually drawn therethrough by outside air currents, it effectively baffles and prevents ingress of air such as to cause drafts.

As is well understood, there is usually an air current on the exterior of such compartments,— either wind velocities or velocities of movement of the compartment, as in an automobile, railway car or the like. Such movement creates a suction which will readily draw the air from the compartment, thereby ventilating the same irrespective of the trough-like baffle positioned in the ventilator. On the other hand, outside air currents will be caught within the trough-like baffle and prevented from entering the compartment.

Other objects and features of the invention will be readily understood from the accompanying drawing and the following specification and claims:

Figure 1 is a perspective view illustrating an automobile window with a ventilator mounted in place. Figure 2 is a central vertical section through a portion of the window frame showing the ventilator mounted therein and the window glass lowered. Figure 3 is a perspective view of the ventilator showing portions thereof in stepped cross section.

In the drawing there is illustrated a vehicle door 10 adapted to partially enclose a compartment or interior of a vehicle and having a sliding glass window 11 supported in the window frame 12. The window frame in the usual case is provided with a channel 13 in which the glass 11 slides, said channel being provided with felt or rubber weather strips 14.

The ventilator comprises a longitudinally extending hood 15 which extends downwardly and outwardly from the window, and is further spaced therefrom by the shoulder 16, said shoulder extending horizontally outwardly to lie against the upper surface of the window frame. The hood is supported and rigidly secured to the upright panel 17 which extends upwardly into the channel 13 of the window frame, exteriorly of the window glass 11. Said panel is provided with a plurality of apertures 18 which may be protected by a screen 19. In the lower edge thereof there is formed an outwardly extending horizontal flange 20 to which is secured a rubber weather stripping 21 extending inwardly to engage against the surface of the window 11 for providing a seal between the window glass and the ventilator.

Rigidly secured within the ventilator and upon the flange 20 there is a trough-like baffle comprising an inwardly extending horizontal flange 22 which seats upon and is rigidly secured to the flange 20, and an upright vertical side portion 23 parallel with but spaced from the panel 17. Said side portion 23 terminates in a reversely bent flared portion 24 extending downwardly and outwardly in substantially parallel relation to the hood 15, thus forming the baffle trough. The height of the trough is substantially less than the height of the hood 15, leaving ample space for air passage, and the lower edge is positioned above the lower edge of the hood 15, as best illustrated in Figure 2.

The above described parts are secured together by any suitable means, such as crimping, soldering, welding or the like, so as to provide a single unit ventilator, and, as shown in Figure 1, the panel 17 extends laterally beyond the hood 15 so that it may be trimmed to any desired length to fit windows of varying widths, and frames having different types of corners. As will be noted in Figures 2 and 3, the flange 20 is doubled upon itself to provide a channel in which the sealing strip 21 is secured by clamping the same in place.

Whereas the ventilator has been specifically shown and described as installed in an automobile window, it will be understood that such disclosure describes only one of the many forms and applications thereof.

The direction of outside air current is diagrammatically illustrated in Figure 2 by dotted arrows. Inasmuch as such air currents are generally directed laterally and seldom, if ever, upwardly, the hood 15 will prevent the air from striking the outer surface of the flared portion 24 of the baffle, directing the air current to the inside of the baffle wherein it will be trapped and prevented from passing into the compartment. The fact that the flared portion of the baffle does not extend downwardly as far as the hood further acts to prevent outside air from entering the passageway between the two, whereby the relative position of the trough-like baffle and the hood, as well as the design of the former, effectively prevents entrance of outside air currents. On the other hand, the outer air currents flowing by the opening of the said passageway creates a suction therein which will readily draw air from the interior through the apertures 18 up and about the baffle and downwardly from under the hood, as indicated by the full line arrows.

The invention claimed is:

1. A ventilator comprising a panel provided with an aperture and having an outwardly extending flange, an outwardly and downwardly flared hood secured to and spaced from the upper portion of the panel by a substantially horizontal shoulder, an inverted trough-like baffle member having an upright portion provided with an inwardly extending flange secured to the flange of said panel, said upright portion terminating in a reversely bent downwardly and outwardly extending flared portion adjacent to and in substantially parallel spaced relation with said hood, and a flexible sealing strip secured to the flange of said panel.

2. In combination with a window frame and a window mounted therein, a ventilator mounted exteriorly thereof comprising an upright panel provided with an aperture, an outwardly and downwardly flared hood secured thereto with its lower edge spaced therefrom, and an inverted trough-like baffle member mounted between said panel and hood, said member having an upright portion secured at its lower edge to the lower part of said panel, extending upwardly in substantially parallel relation thereto and spaced therefrom, and a downwardly extending flared portion intermediate the upright portion and hood.

3. In combination with a window frame, a window mounted therein and a ventilator mounted exteriorly thereof, comprising an upright panel provided with an aperture, said panel having laterally extending non-apertured portions conforming to the width of the window, an outwardly and downwardly flared hood secured thereto to embrace said aperture with the lower edge thereof spaced from said panel, an inverted trough-like baffle member within said hood having an upright portion secured to said panel below the aperture therein, and a downwardly extending flared portion adjacent to and in substantially spaced relation with said hood.

4. In combination with a window frame, a window mounted therein and a ventilator mounted exteriorly thereof, comprising an upright panel provided with an aperture, said panel having laterally extending non-apertured portions conforming to the width of the window, an outwardly and downwardly flared hood secured thereto to embrace said apertures with the lower edge thereof spaced from said panel, an inverted trough-like baffle member within said hood having an upright portion secured to said panel below the apertures therein, a downwardly extending flared portion extending adjacent to and in substantially spaced relation with said hood, and a flexible sealing strip secured to the lower edge of said panel and extending inwardly therefrom adjacent to and in contact with said window.

JOHN J. GAUGHRAN, Jr.
EDWARD GAUGHRAN.